United States Patent [19]

Dennison et al.

[11] Patent Number: 5,006,247

[45] Date of Patent: Apr. 9, 1991

[54] ASYMMETRIC POROUS POLYAMIDE MEMBRANES

[75] Inventors: Kathleen A. Dennison, St. Paul; Bruce E. Kolcinski, Birchwood Village; Subramanian Krishnan, St. Paul; Patrise M. Russell, Birchwood Village, all of Minn.

[73] Assignee: Minnesota Mining and Manufacturing Company, St. Paul, Minn.

[21] Appl. No.: 394,229

[22] Filed: Aug. 15, 1989

[51] Int. Cl.$^5$ .................. B01D 67/00; B01D 69/02; B01D 71/56

[52] U.S. Cl. .................. 210/500.38; 264/45.1; 264/212

[58] Field of Search ............. 525/276, 426; 210/634, 210/640, 644, 649–654, 500.21, 500.27, 500.23, 500.38; 264/41, 41.5, 556, 212, 298, DIG. 48, DIG. 68

[56] References Cited

U.S. PATENT DOCUMENTS

| | | | |
|---|---|---|---|
| 3,615,024 | 10/1971 | Michaels | 210/490 |
| 3,876,738 | 4/1975 | Marinaccio et al. | 264/41 |
| 3,988,245 | 10/1976 | Wang | 210/500 |
| 4,340,479 | 7/1982 | Pall | 210/490 |
| 4,340,480 | 7/1982 | Pall et al. | 210/490 |
| 4,340,481 | 7/1982 | Mishiro et al. | 210/500 |
| 4,482,514 | 11/1984 | Schindler et al. | 264/41 |
| 4,627,992 | 12/1986 | Badenhop et al. | 427/244 |
| 4,629,563 | 12/1986 | Wrasidlo | 210/500 |
| 4,666,991 | 5/1987 | Matsui et al. | 525/426 |
| 4,722,795 | 2/1988 | Gohl et al. | 210/500 |
| 4,818,452 | 4/1989 | Kneifel et al. | 264/41 |

FOREIGN PATENT DOCUMENTS

037730B1 of 0000 European Pat. Off. .
0247596A2 of 0000 European Pat. Off. .
58094863 of 0000 Japan .
63296940 of 0000 Japan .

OTHER PUBLICATIONS

Kirk–Othmer Encyclopedia of Chemical Technology, 34d ed., vol. 18, John Wiley & Sons, 1982, pp. 350–353.
DuPont Brochure No. E-26345.
Monsanto Brochure No. 8-1117,0880-02.
Celanese "Bulletin No. N1A", Brochure No. 10M/583-5M85.

Primary Examiner—Frank Sever
Attorney, Agent, or Firm—Gary L. Griswold; Walter N. Kirn; Eloise J. Maki

[57] ABSTRACT

Asymmatric, porous polyamide membranes permeable to fluid flow comprising:

(A) a porous skin layer, and
(B) adjacent to the skin layer, an integral, porous support layer having at least one region comprising a network of substantially parallel, hollow tube-like structures, each of the tube-like structures being oriented such that the longitudinal dimension of each tube-like structure is essentially perpendicular to the skin layer;

wherein:

the skin layer is relatively thin and dense compared to the support layer,
the pore diameters in the skin layer are relatively small compared to the diameters of the tube-like structures in the support layer,
in membranes having support layers with more than one region, the cross-sectional area of the tube-like structures is larger in regions located farther from the skin layer, and
the polyamide is an aliphatic polyamide having a glass transition temperature of less than 200° C., and method of making the same. These membranes are useful in ultrafiltration and microfiltration processes.

31 Claims, 4 Drawing Sheets

ASYMMETRIC POROUS POLYAMIDE MEMBRANES

FIELD OF THE INVENTION

This invention relates to porous asymmetric polyamide membranes useful in microfiltration and ultrafiltration.

BACKGROUND OF THE INVENTION

Canadian Patent No. 1,168,006 (Wrasidlo) discloses an asymmetric ultrafiltration membrane having a skin layer supported by an "open honeycomb structure". The specification states that only polymeric materials having glass transition temperatures of at least 200° C. would be suitable in the invention since only polymers having such relatively high glass transition temperatures are sufficiently rigid to form the honeycomb support structure. Of the polyamides, only polyarylamides were specifically identified as useful. The specification also states that the skin layer of the membranes has slit-like fissures instead of substantially circular pores.

U.S. Pat. No. 4,629,563 (Wrasidlo) discloses asymmetric membranes which may be used as ultrafilters or microfilters. The membranes can have a skin layer and a porous, asymmetric, reticulated support layer. The membranes described in the '563 patent can be made of polyamide, however, only polyhexamethylene terephthalamide, an araliphatic polyamide, is specifically disclosed. The membranes are formed by casting a polymer dope while that dope is in an unstable liquid dispersion condition.

U.S. Pat. No. 4,627,992 (Badenhop et al.) describes membranes formed from aromatic polyamide resins. The membranes described in the '992 patent can be symmetric or asymmetric and can be produced using a solution of the polyamide in an aprotic solvent.

U.S. Pat. No. 4,340,481 (Mishiro et al) describes a hollow fiber membrane having a three-dimensional net-like structure of fine pore passages. In Example 8, one such hollow fiber membrane is prepared from a casting solution containing 18 weight percent polyamide, methyl alcohol, water and calcium chloride dihydrate using a 1:1 methanol/water coagulation bath.

U.S. Pat. No. 4,722,795 (Gohl et al.) describes asymmetric, self-supporting membranes, useful for ultrafiltration, which may be in the form of a flat sheet, tube, or hollow fiber. The patent states that suitable membrane materials are polymers which are soluble in polar, non-protonic organic solvents such as dimethylsulfoxide. While the patent states that polyamides are preferred for use in forming the membranes, only an aromatic polyamide is specifically disclosed.

U.S. Pat. No. 3,876,738 (Marinaccio et al.) describes a process for making microporous membranes in which a film-forming polymer, e.g. nylon, is dissolved in a solvent system, e.g., a formic acid solution, the resulting solution is cast to form a film, and the film is quenched in a non-solvent bath, e.g. water/salt or alcohol/salt solutions, to form a microporous membrane. This patent does not state that these membranes are asymmetric.

U.S. Pat. No. 4,482,514 (Schindler et al.) describes a process for preparing ultrafiltration membranes using a formic acid solution of polyamide containing about 1 to 7% polyethylene glycol. The patent states that the membrane possesses an ultrafiltration skin layer and a backing layer in which the pore size increases with the distance from the ultrafiltration skin. FIG. 2 of the patent depicts a cross-sectional view of a membrane having a gradually increasing pore size.

Japanese Kokai Application JP 58094863, laid open June 6, 1983, describes polyamide membranes having a rough surface and a smooth surface. It describes the process of preparing one such membrane which includes preparation of a 10 to 40 weight percent solution of nylon 6,6 dissolved in formic acid mixed with calcium chloride and water, casting of the resulting solution, and intermittent coagulation, e.g. by repeated dipping of the cast membrane in a coagulation bath, of the cast film to form an uneven surface. The disclosed pore sizes range from 0.05 to 500 $\mu$m on the rough surface and 1 to 1000 $\mu$m on the smooth surface.

U.S. Pat. No. 3,615,024 (Michaels) describes anisotropic membranes which can be formed from polyamides such as polyhexamethylene adipamide and other such polyamides known as "nylon", however, no such membranes are exemplified.

U.S. Pat. Nos. 4,340,480 and 4,340,479 (Pall et al.) disclose a process for preparing skinless liquophilic alcohol-insoluble polyamide microfiltration membranes from polyamide having a ratio of methylene to amide groups of about 7 to 1 to about 12 to 1. The patents disclose that membranes prepared according to the described process have pores of uniform diameter. The patents also state that their membranes can have "tapering pores" but they do not describe highly asymmetric membranes.

SUMMARY OF THE INVENTION

This invention provides an asymmetric, porous polyamide membrane permeable to fluid flow comprising:
(A) a porous skin layer, and
(B) adjacent to the skin layer, an integral, porous support layer (i.e., a support layer formed in the same operation or step and having substantially the same composition as the skin layer) having at least one region comprising a network of substantially parallel, hollow tube-like structures, each of the tube-like structures being oriented such that the longitudinal dimension of each tube-like structure is essentially perpendicular to the skin layer;

wherein:
the skin layer is relatively thin and dense compared to the support layer,
the pore diameters in the skin layer are relatively small compared to the diameters of the tube-like structures in the support layer, and
in membranes having support layers with more than one region, the cross-sectional area of the tube-like structures is larger in regions located farther from the skin layer, and
the polyamide is an aliphatic polyamide having a glass transition temperature of less than 200° C.

This invention further provides supported asymmetric membranes, i.e., membranes comprising the polyamide membrane described above and a preformed, porous, support layer, e.g. non-woven web, woven cloth or paper, having two parallel surfaces.

This invention also provides a method of preparing the asymmetric and supported asymmetric membranes described above comprising the steps of:
(a) preparing a casting solution comprising the polyamide dissolved in an alcohol/salt solution;
(b) coating a film of preselected thickness of the casting solution onto the surface of a casting substrate (e.g. a TEFLON-coated surface, glass, or polyethylene terephthalate) or coating a film of preselected thickness of the casting solution onto one or both of the parallel surfaces of a preformed, porous support material and placing the resulting coated preformed support on a casting substrate, or (c) extruding a hollow fiber of the casting solution through an annular die;

(d) immersing the resulting film, coated preformed support, or hollow fiber in a liquid non-solvent bath thereby precipitating the polyamide and forming an asymmetric polyamide membrane or asymmetric, supported polyamide membrane, and recovering the membrane or supported membrane from the non-solvent bath and drying it.

The membranes of this invention can be useful in microfiltration or ultrafiltration separation processes depending upon the pore size of the porous skin layer.

DETAILED DESCRIPTION OF THE INVENTION

Figure 1:
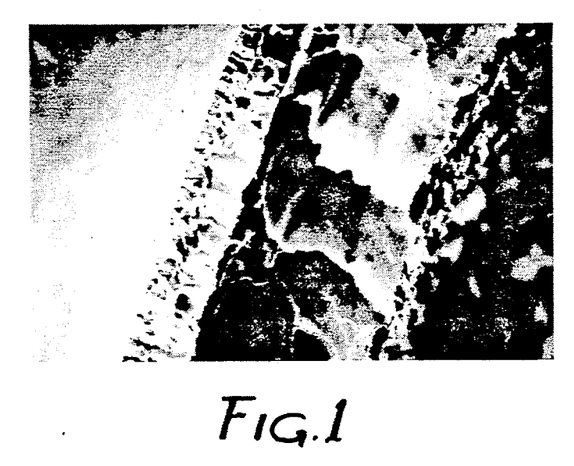
FIG. 1 is reproduced from a scanning electron photomicrograph showing a 420 ×s magnification of a cross-sectional view of one of applicants' membranes. This membrane was formed from a casting solution comprising 5 weight percent, based on total casting solution weight, of polyamide.
Figure 2:
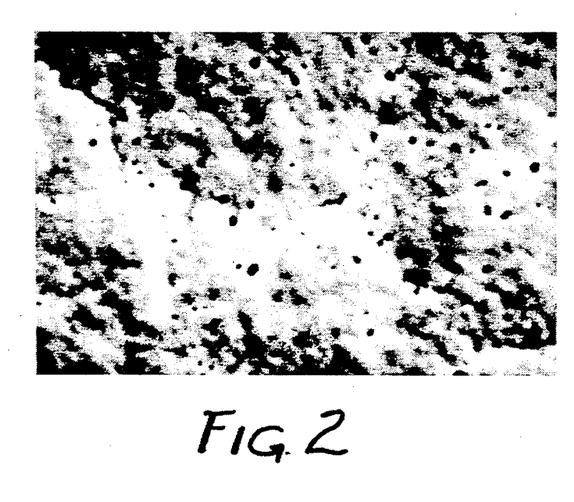
FIG. 2 is reproduced from a scanning electron photomicrograph showing a 11,700 ×s magnification of the top surface of the porous skin layer of the membrane shown in FIG. 1.
Figure 3:
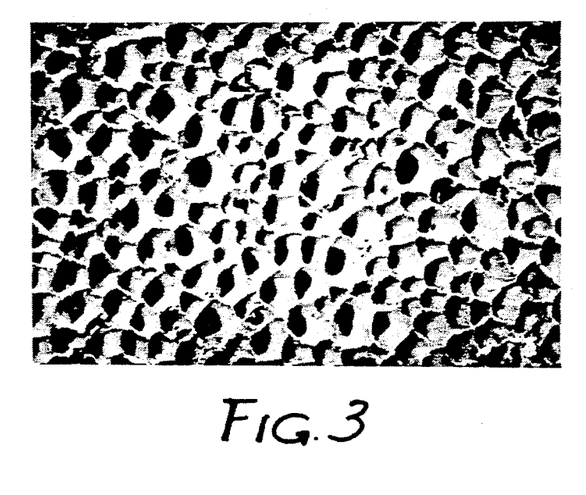
FIG. 3 is reproduced from a scanning electron photomicrograph showing a 116 ×s magnification of the bottom surface of the porous support layer of the membrane shown in FIG. 1.
Figure 4:
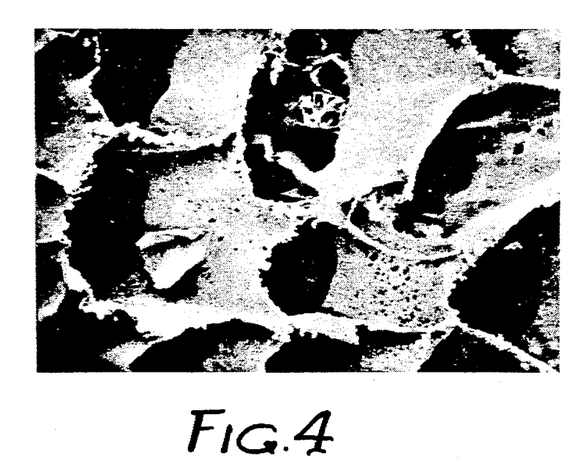
FIG. 4 is reproduced from a scanning electron photomicrograph showing a 590 ×s magnification of the bottom surface of the porous support layer of the membrane shown in FIG. 3.
Figure 5:
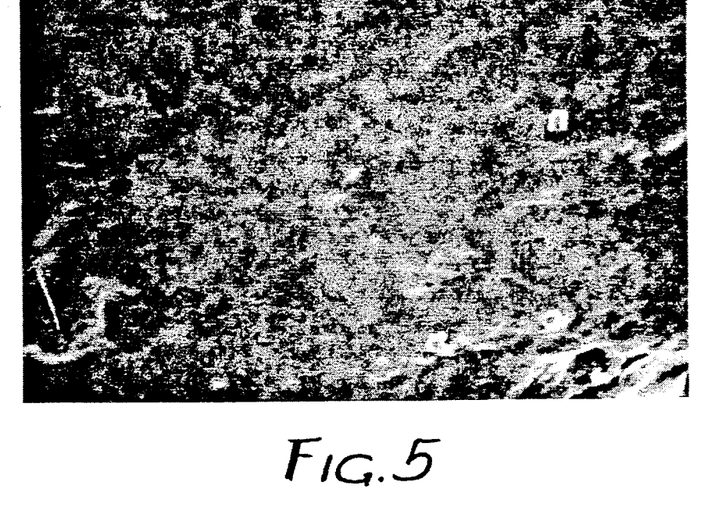
FIG. 5 is reproduced from a scanning electron photomicrograph showing a 3500 ×s magnification of the top surface of a porous skin layer formed from a casting solution comprising 9 weight percent, based on total casting solution weight, of polyamide.
Figure 6:
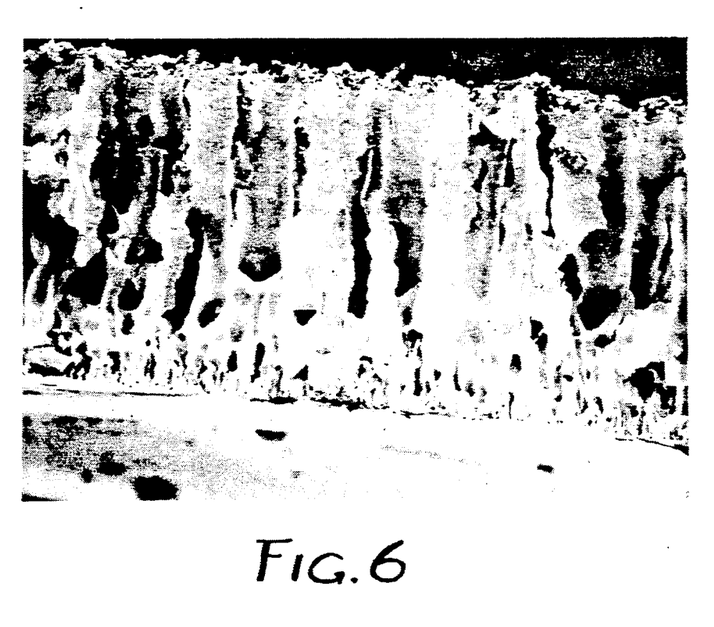
FIG. 6 is reproduced from a scanning electron photomicrograph showing a 250 ×s magnification of a cross-sectional view of the membrane shown in FIG. 5.
Figure 7:
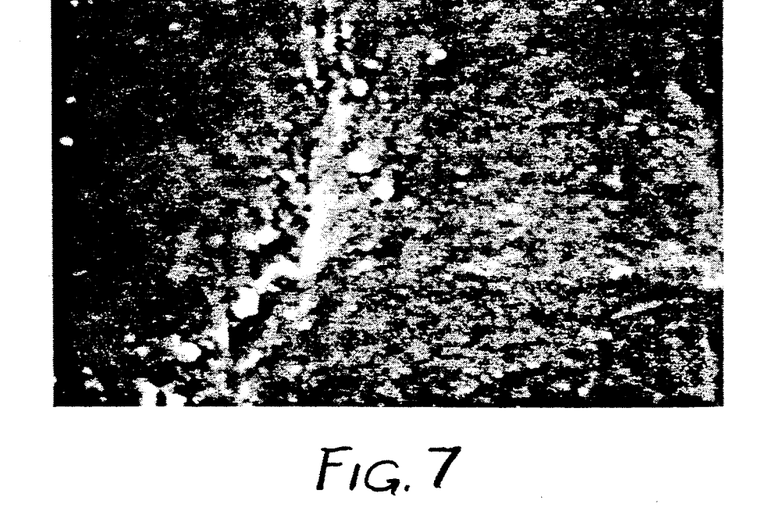
FIG. 7 is reproduced from a scanning electron photomicrograph showing a 5000 ×s magnification of the top surface of a porous skin layer formed from a casting solution comprising 12 weight percent, based on total casting solution weight, of polyamide.
Figure 8:
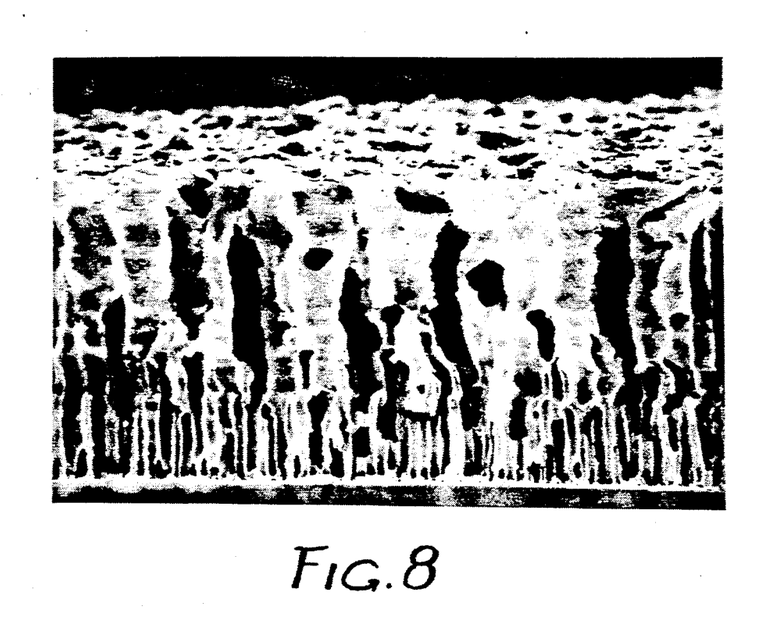
FIG. 8 is reproduced from a scanning electron photomicrograph showing a 350 ×s magnification of a cross-sectional view of the porous membrane shown in FIG. 7.

Some of the asymmetric membranes of this invention have support layers comprising two or more regions or layers each of which comprises a three-dimensional network of substantially parallel, hollow tube-like structures oriented such that the longitudinal dimension of each tube-like structure is essentially perpendicular to the skin layer. Generally, each tube-like structure in a particular region of the support layer will have approximately the same cross-sectional area. However, the tube-like structures in adjacent support layer regions may have significantly different cross-sectional areas. This may result in the support layer appearing to be comprised of distinct, discontinuous regions or layers each comprising tube-like structures of approximately the same cross-sectional area. When adjacent regions are comprised of tube-like structures having similar cross-sectional areas, the support layer may appear to be comprised of tapered tube-like structures whose cross-sectional area increases with increasing distance from the skin layer.

The polyamides useful in preparing the asymmetric membranes of this invention have glass transition temperatures below 200° C., preferably below 100° C., and most preferably below 60° C. The polyamides useful in this invention are aliphatic, that is, they can be selected from the group consisting of aliphatic polyamides, which includes cycloaliphatic polyamides. Blends of polyamides are also useful in this invention.

Some classes of the polyamides useful in this invention can be represented by the following general formulas:

wherein each R group may be independently selected from the group consisting of H, and alkyl groups having 1 to 4 carbon atoms, and each $R^1$ and $R^2$ or $R^3$ group may be independently selected from the group consisting of linear or branched aliphatic or cycloaliphatic moieties or combinations thereof. Generally in any particular polymer (I), all $R^1$ groups will be the same and all $R^2$ groups will be the same, and in any particular polymer (II), all $R^3$ groups will be the same. Generally $R^1$, $R^2$, and $R^3$ groups will have from 1 to 12 carbon atoms, and preferably 1 to 10. $R^1$, $R^2$, and $R^3$ groups can also contain hetero atoms such as oxygen, nitrogen, and sulfur.

Generally the polyamides useful in this invention will have weight average molecular weights in excess of about 10,000 and can be prepared according to conventional methods such as those described in *Kirk-Othmer Encyclopedia of Chemical Technology*, 3rd Ed., Vol. 18, John Wiley & Son 1982, pp. 350–353. Many of the polyamides useful in this invention are known and are commercially available, e.g., nylon 6,6 (i.e., poly(hexamethylene adipamide), nylon 6,9, and nylon 6 (i.e., polycaprolactam). Nylon 6,6 is commercially available from E.I. DuPont de Nemours Company as ZYTEL 101 or 120, described in DuPont brochure no. E-26345, from Monsanto Corporation as VYDYNE 21, described in Monsanto brochure no. 8-1117-0880-92, and from Celanese Corporation as 1001-1 or 1200-1, described in Celanese "Bulletin N1A" brochure no. 10M/583-5M85. Nylon 6 is commercially available from Badische Corporation as B-300 and B-4407, and from Nylon Corporation of America as NYCOA 471, 466, and 589. Nylon 6,9 is commercially available from Aldrich Chemical Company and from Monsanto Corporation as VYDYNE 60H and 602M and Nylon 6,6/6 copolymer available from Monsanto Corporation as VYDYNE 80X.

The casting solution used to make the asymmetric membranes of this invention is prepared by dissolving one or more of the polyamides described above in casting solvent. A casting solvent is a solution of salt dissolved in a lower (i.e., C1 to C4) alcohol or mixture of lower alcohols. The selection of alcohol, salt, and level of salt is largely determined by the solubility of the polyamide in the casting solvent. Representative examples of lower alcohols and lower alcohol mixtures useful in this invention are lower alkanols and mixtures of lower alkanols, e.g., methanol, ethanol, propanol, butanol, and ethanol/methanol, ethanol/propanol, and methanol/propanol mixtures. Methanol, ethanol, and mixtures containing at least 50 weight percent of methanol or ethanol are more preferred because a number of commonly available salts are soluble in them. The salt used to make the casting solution should increase the solubility of the polyamide in the alcohol. Representative salts include anyhdrous calcium chloride, calcium chloride dihydrate, calcium iodide tetrahydrate, calcium nitrate tetrahydrate, calcium salicylate and lithium chloride and blends thereof. Preferably calcium chloride dihydrate is used to make the casting solvent.

The casting solution is a homogeneous solution at the time and temperature of casting the membrane. Preferably, it is a stable solution, i.e., does not phase separate upon standing at room temperature. The casting solution should also have a viscosity low enough to permit stirring and coating of the solution on a casting substrate or on a preformed membrane support. The solution viscosity will depend to some extent on the type, molecular weight, and concentration of polyamide used to make the solution. For example, a particular casting solution containing 8 weight percent of nylon 6,6 will have a viscosity of about 5000 cp at room temperature while a 5 weight percent solution will have a viscosity of about 1200 cp at room temperature. Casting solution viscosities below about 500 cp at room temperature are generally not preferred.

Typically the casting solution contains 10 to 50 weight percent of salt, based on total casting solution weight, and preferably 35 weight percent. The alcohol generally comprises 47 to 76 weight percent of the casting solution, based on total casting solution weight, and preferably about 60 weight percent. Generally the casting solution comprises about 3 to 14 weight percent of polyamide, based on the total weight of the casting solution. The optimum polyamide concentration depends on the molecular weight of the polymer and evaporation time used. However, the desired polyamide must be soluble at a level of at least about 3 weight percent because concentrations of less than about 3 weight percent will not result in the formation of a membrane having the desired structure.

A preferred casting solution can be prepared by mixing 35 parts by weight of calcium chloride dihydrate with 65 parts by weight of methanol, refluxing the mixture until the calcium chloride dihydrate has completely dissolved, mixing 4 to 7 parts by weight of nylon 6,6 with the salt/alcohol solution, and refluxing the resulting mixture until the nylon has completely dissolved.

Optionally, the casting solution can also contain non-interferring, conventional casting solution additives. The relative amounts and types of additives should be selected so as not to adversely affect final membrane structure. One such additive is non-ionic surfactant, e.g. TRITON-X 100 commercially available from Rohm & Haas Corporation or TWEEN 20 commercially available from ICI Americas, Incorporated. Blends of non-ionic surfactants may also be used. Generally the casting solution will comprise less than 1 weight percent surfactant and more typically less than 0.5 weight percent. The casting solution may also comprise small amounts of pore formers, swelling agents, and plasticizers. The casting solution may further comprise non-solvent, e.g. water, or blends of non-solvents. Generally, the effect of added non-solvent on the final membrane structure is relatively small, but typically an increasing amount of non-solvent in the casting solution results in larger pores in the membrane's skin layer. The maximum amount of additives that can be added to the casting solution is limited by the solubility of the polyamide in the resulting solution and may depend on the salt concentration in the casting solution and the type of salt used in the casting solution. Generally, the higher the salt concentration the greater the amount of water that can be added to the casting solution. However, the maximum amount of water that can be added to the casting solution is reduced by any amount of water that was initially complexed to the salt. For example, the maximum amount of water that can be added to a casting solution comprising methanol and calcium chloride is about 0.8 g of water per 1 g of calcium chloride.

The casting solution can be formed into a sheet or film by coating or depositing on the desired area of the exposed surface of a casting substrate the desired thickness of casting solution. The casting substrates useful in this invention include many of the substrates known in the art. For example, the substrates include, glass, glass-coated materials, stainless steel, poly(ethylene terephthalate), polypropylene, poly(tetrafluoroethylene)-coated materials, and silicone coated paper or belts. Conventional casting methods and equipment may be used such as knife coaters, slot-fed knife coaters, and notch bar coaters. The casting solution may also be coated directly onto a porous, preformed support having two parallel surfaces to form one of the supported or composite membranes of this invention. Representative examples of such preformed supports are nonwoven fibrous webs, woven fabrics or paper. The casting solution is applied to one or both of the parallel surfaces. Casting the membrane on such a support can provide additional strength to the membrane. The preformed support must have a very porous or open structure so that it does not restrict the flow of fluids through the membrane. That is, the average pore size of the support should be at least as large as the biggest pore in the membrane. In order to facilitate the formation of the membrane and reduce the number of pinholes in the membrane, the preformed support should be made of a material which can be wet by the casting solution. Generally, a preformed support comprising polyamide material will be more easily wet by the casting solution.

When a hollow fiber membrane is desired, the casting solution can be extruded through an annular die. Optionally, air or liquid in which the polyamide is insoluble can flow through the lumen of the fiber. The liquid need not be the same as the non-solvent used in the non-solvent bath. Conventional extrusion methods and equipment may be used to prepare hollow fiber membranes of this invention.

The solution can be cast or extruded to a wet thickness about 0.05 to 0.51 mm (0.002 to 0.020 in) thick. This generally will result in a dry membrane about 0.025 to 0.25 mm (0.001 to 0.010 in) thick. Preferably, the solution is cast to a wet thickness of about 0.10 to 0.18 mm (0.004–0.007 in) which generally results in dry membranes between 0.051 to 0.152 mm (0.002 to 0.006 in) thick.

After depositing the casting solution on the substrate, the coated substrate may optionally be exposed to air for drying. Exposure to air can affect the thickness and porosity of the skin layer of the membrane. The longer the membrane is exposed to air, the less porous the skin layer of the membrane will be. Exposure times of up to 120 seconds may be used, however, an exposure time about 30 seconds or less, e.g. 5 to 15 seconds, is preferred.

After the optional drying step described above, the still-wet membrane is exposed to a non-solvent, such as water or water vapor, to precipitate the polyamide to form the membrane. The preferred non-solvent comprises water or water and water vapor. Exposure to non-solvent only in the form of vapor does not yield membranes having applicants' characteristic membrane structure. Hence if non-solvent vapor is to be used to precipitate the polyamide, exposure to the vapor must be short, e.g., 10 min. or less, and such exposure must be followed by immersion of the membrane in a liquid non-solvent bath. When water vapor is used as one of the non-solvents, the humidity in the chamber should be kept above about 50 percent relative humidity, and most preferably should be 90 to 100 percent relative humidity. However, since it is simpler to use only one precipitation step, immersion of the membrane in a liquid non-solvent bath is the preferred method of exposing the wet membrane to the non-solvent.

Some of the liquid non-solvent baths useful in this invention comprise a major amount of water and a minor amount of a polar organic solvent. Suitable polar organic solvents include the lower (i.e. having one to four carbon atoms) alkanols, e.g. isopropanol, the lower ketones, e.g., acetone and methylethyl ketone, lower ethers, e.g., tetrahydrofuran, lower nitriles, e.g., acetonitrile, and lower amides, e.g., dimethyl formamide. Acetone is particularly preferred. As much as 20 to 25 volume percent of the total non-solvent bath may be polar organic solvent. However, preferably the bath will contain less than about 20 volume percent, and most preferably less than 15 volume percent of polar organic solvent.

The liquid non-solvent bath is generally maintained at room temperature. Bath temperatures below room temperature tend to result in slower coagulation or precipitation rates. The coated casting substrate or extruded hollow fiber should be immersed in the bath and remain there for at least 1 minute or until the membrane begins to float off the casting substrate. The membrane may then be recovered from the bath and washed with water.

A membrane may be dried after formation and recovery by any suitable means. Drying with forced, heated air hastens drying time but promotes wrinkling of the membrane if the membrane is not dimensionally secured during drying. A wet membrane allowed to dry under ambient conditions releases easily from polytetrafluoroethylene-coated substrate surfaces.

The flux rate through the membranes of this invention can be varied by varying the percent porosity of the membrane (i.e., percent of the membrane volume comprising voids), the asymmetric ratio (i.e., the ratio is the average pore diameter on the bottom surface of the support layer divided by the average pore diameter of the skin layer), and/or the average pore diameter of the skin layer The flux rate can also be varied by controlling the thickness of the membrane, and by using multiple thicknesses of membrane. For example, a single layer or thickness of some of the microfiltration membranes of this invention will have normalized air flux rates of about 2.5 L/kPa(sec)m$^2$ to about 75 L/kPa(sec)m$^2$, and will have bubble points of about 0.5 to about 20 $\mu$m.

The process variables having the greatest impact on the percent porosity of the membrane, asymmetric ratio, and average pore diameter of the retentive layer are:
(1) the concentration of the polyamide in the casting solution,
(2) the concentration of non-solvent in the liquid non-solvent bath, and
(3) the time the membrane is exposed to air between the casting and precipitation steps. For example, a reduction of average pore diameter of the skin or retentive layer may be achieved by increasing the concentration of polyamide in the casting solution and/or increasing the time of exposure to air between casting and precipitation steps. The average pore diameter can be increased by increasing the amount of polar organic solvent in the liquid non-solvent bath.

The average pore diameter of the skin layer of membranes of this invention is selected based on the desired application, i.e. ultrafiltration or microfiltration, of the membrane and can be controlled using the process variables described above. Some of the membranes of this invention have average skin layer pore diameters of about 0.001 $\mu$m to 10 $\mu$m, and average pore diameters on the bottom surface of the support layer of about 20 to 500 $\mu$m. Typically, the percent porosity of the membranes of this invention will be greater than about 70 percent, and preferably greater than 80 percent. The asymmetric ratio must be greater than 1, and preferably is greater than about 10, e.g., about 10 to 100,000. Asymmetric ratios of 2000 or more have easily been achieved using the process of this invention. Large asymmetric ratios are desirable since a high degree of membrane asymmetry can contribute to higher flux rates through the membrane. However, membranes having large pore diameters on the bottom surface of the support layer may be more likely to compact or compress during use resulting in lower membrane flux rates. However, the degree of compaction is also strongly dependent on membrane thickness. For example, a nylon 6,6 membrane having a dry thickness of 0.25 mm may have an 87 percent flux decline at 345 kPa (as determined by the difference between the initial flux and the steady state flux at the measured pressure). A membrane having a 0.12 mm dry thickness may have a flux decline of 21 percent or less at 345 kPa, and a membrane having a 0.04 mm dry thickness may have a flux decline of 10 percent or less at 345 kPa.

Objects and advantages of this invention are illustrated in the following examples, in which the preparation of various membranes are described as well as some tests thereof indicative of their utility.

EXAMPLE 1

An amount of calcium chloride dihydrate (230 g) was mixed with 500 mL of methanol. The resulting mixture was refluxed overnight to yield a clear solution. An amount (25 g) of nylon 6,6, available as CELANESE 1200-1 (avg. MW 135,000), was added to 475 g of the solution of calcium chloride in methanol. This mixture was refluxed overnight to yield a clear casting solution (containing 5 weight percent polyamide) which was allowed to cool to room temperature before casting the membrane.

An amount (35 mL) of the casting solution was deposited onto a 35 cm × 50 cm glass plate and spread to a wet thickness of 254 $\mu$m to 305 $\mu$m using a glass plate with shims parallel to the edges of the plate. The casting plate was immediately immersed in a non-solvent bath consisting of 1900 mL of water and 100 mL of acetone held at 22°–24° C. The plate remained immersed in the bath for about 1 minute after which the membrane was removed from the bath, blotted with paper towels, and was laid on a TEFLON-coated sheet and allowed to dry, skin side up, at ambient temperature for about 3 hours. The dry thickness of the membrane was about 51 to 64 $\mu$m.

Bubble points and normalized air flow rates were measured on the membrane. Both tests were performed on 47 mm diameter disks die-punched from a pinhole-free area of the membrane. The air flow rate measurements were carried out using an apparatus having a membrane sample mounted in a 47 mm diameter, stainless steel filter holder from Fischer Scientific, Inc. The membrane sample was mounted such that the skin layer faced upstream. Nitrogen gas was applied to the upstream side of the membrane until a standard flow rate of 14.85 standard liters/min. was measured on a rotameter located on the downstream side of the membrane. When this flow rate was achieved, the pressure drop across the membrane was measured using an Ashcroft "brazed" pressure gauge. The air flow rate measurement provides an indication of the resistance of the membrane to the transport of fluids through the membrane. The normalized air flow rate was then calculated using the following formula:

$$\frac{\text{normalized}}{\text{flow rate}} = \frac{14.85 \ L/min.}{(\text{pressure drop})(\text{filter area})(60 \ s/min.)}$$

where the pressure drop is in kPa and the filter area is in m$^2$. The membrane was found to have normalized air flow of 8.34 L/kPa(sec)(m$^2$).

The bubble point was determined using an apparatus similar to that used to measure the air flow rate. The bubble point was measured on a sample of the membrane throughly wet with LUBINOL mineral oil (having a mathematical constant of 14.4 which is commercially availiable from Kalipharmo, Inc.) mounted in the filter holder such that the skin side of the membrane faced upstream. A tube extended from the downstream side of the filter holder into a reservoir filled with soapy water. The pressure on the upstream side of the membrane was then increased by slowly increasing the flow of nitrogen gas to the upstream side of the membrane until bubbles first appeared in the soapy water. The pressure at which bubbles first appeared was identified as the bubble point. Pore size was then be correlated to the bubble point pressure using the following formula:

Pore size ($\mu$m) = 2.09/ pressure (kPa)

The membrane had a bubble point of 0.87 $\mu$m.

The membrane was also subjected to a latex particle challenge test. The challenge test was performed using an aqueous solution of Dow polystyrene particles having a mean diameter of 0.22 $\mu$m. The solutions of latex particles had an absorbance of about 0.190–0.200 (measured using a Beckman Model 35 spectrophotometer using a visible light source at a wave length of 420 nm). A pinhole-free sample of membrane was mounted in an AMICON Model 12, 25 mm filter assembly operated in a straight filtration, no recirculation mode. Each of the latex particle solutions was filtered through the membrane. The filtrate or permeate passing though the membrane was collected and its absorbance was measured using the same spectrophotometer and light source described above. The percent of particles retained by the membrane was then calculated using the following fomula:

$$\% \text{ retained} = \frac{(\text{initial solution absorb.} - \text{filtrate absorb.})}{\text{initial solution absorb.}}$$

The membrane retained 99.5 percent of latex particles having a mean diameter of 0.22 $\mu$m illustrating the membrane's usefulness for microfiltration processes.

Scanning electron photomicrographs of this membrane revealed that the membrane possessed the characteristic structure of the membranes of this invention. Scanning electron photomicrographs were also used to estimate the average pore diameters. Photomicrographs showed that the average pore diameter of the skin layer of the membrane was about 0.1 $\mu$m and that the average pore diameter on the bottom surface of the support layer was about 100 to 200 $\mu$m. Thus, the membrane had an asymmetric ratio of about 1000:1 to about 2000:1.

EXAMPLES 2–3

The procedure described in Example 1 was repeated except that the casting solution contained 5.5 weight percent of a Nylon 6 (commercially available as NYCOA 471), and the acetone concentration in the non-solvent bath was either 5 or 15 weight percent. Air flow rate measurements were carried out according to the procedure described in Example 1. The membranes had normalized air flow rates of 36.2 and 145 L/kPa(-sec)(m$^2$), respectively.

EXAMPLES 4–14

The procedure described in Example 1 was repeated except that various types and amounts of the polar organic solvent used in the non-solvent bath were used. Air flow rates and bubble points were determined using the procedures described in Example 1. The types and amounts of polar organic solvent, and the properties of the resulting asymmetric membranes are summarized in Table 1.

TABLE 1

| | Effect of Immersion Bath Composition | | |
|---|---|---|---|
| Example | Solvent | Bath Composition (volume water/ volume solvent) | Normalized air flow (L/kPa(sec)m$^2$) | Bubble point ($\mu$m) |
| 4 | DMF | 95/5 | 33.60 | 3.65 |
| 5 | DMF | 90/10 | 44.74 | 2.06 |
| 6 | DMF | 85/15 | 74.64 | 3.08 |
| 7 | DMF | 80/20 | 74.64 | 3.20 |
| 8 | MEK | 95/5 | 37.34 | 2.1 |
| 9 | MEK | 90/10 | 74.64 | 4.0 |
| 10 | IPA | 95/5 | 43.51 | 2.64 |
| 11 | IPA | 90/10 | 43.51 | 5.0 |
| 12 | IPA | 85/15 | 62.19 | 9.6 |

TABLE 1-continued

Effect of Immersion Bath Composition

| Example | Solvent | Bath Composition (volume water/ volume solvent) | Normalized air flow (L/kPa(sec)m$^2$) | Bubble point ($\mu$m) |
| --- | --- | --- | --- | --- |
| 13 | ACN | 95/5 | 41.48 | 3.8 |
| 14 | ACN | 90/10 | 74.64 | 2.88 |

The data indicates that increasing the level of polar organic solvent in the liquid non-solvent bath generally results in greater air flow rates.

EXAMPLES 15-16

The procedure of Example 1 was repeated except that a 5 weight percent solution of a nylon 6 commercially available as NYCOA 471 was used as the casting solution in Example 15, and 4.5 weight percent solution of the nylon 6 was used in Example 16. In Comparative Examples C1 and C2, a double thickness of each of the membranes of Examples 15 and 16, respectively, were tested. The membranes were arranged so that their skin layers were in a face-to-face orientation. The normalized air flow rates and bubble points of the resulting asymmetric membranes and their double thicknesses were measured according to the procedures described in Example 1. The membranes used, number of thicknesses, normalized air flow rates, and bubble points are summarized in Table 2.

TABLE 2

Effect of Multiple Thicknesses

| Example | Number of thicknesses | Normalized Flow Rate (L/kPa(sec)m$^2$) | Bubble Point ($\mu$m) |
| --- | --- | --- | --- |
| 15 | 1 | 4.67 | 3.2 |
| C1 | 2 | 2.42 | 0.65 |
| 16 | 1 | 7.81 | 7.0 |
| C2 | 2 | 3.87 | 1.3 |

The data shows that while doubling the thickness of the membranes reduces the bubble point of the membrane, it also reduces the normalized air flow rate. This illustrates that a membrane of this invention can be sandwiched or layered to vary the flow rates and bubble point of the final membrane.

EXAMPLE 17

The procedure of Example 1 was repeated except that the coated casting substrate was immersed in a 95:5 volumetric mixture of water and methyl ethyl ketone. The resulting membrane was 51 $\mu$m thick and had normalized air flow of 145 L/kPa(sec)m$^2$ and a bubble point of 5 $\mu$m. A double thickness of this membrane had a normalized flow of 75 L/kPa(sec)m$^2$ and a bubble point of about 2.5 $\mu$m. A triple sandwich has a normalized flow rate of greater than about 36 L/kPa(sec)m$^2$ and a bubble point of 1.2 $\mu$m. This illustrates that a membrane of this invention can be sandwiched or layered to vary the flow rates and bubble point of the final membrane.

EXAMPLE 18

This example illustrates the use of a mixture of polyamides to form one of the membranes of this invention.

A 5.0 weight percent polyamide casting solution was prepared using a 50/50 weight percent mixture of nylon 6 (commercially available as NYCOA 589) and nylon 6,6, (commercially available as CELANESE 1200-1) and a 37 weight percent calcium chloride dihydrate solution in methanol. The resulting mixture was refluxed about 12 hours to yield a generally clear and stable solution.

This casting solution was then spread on a polyethylene terephthalate (i.e., PET) casting substrate using 10.2 cm Gardner knife coater set at a clearance of 0.25 mm. The coated casting substrate was then exposed to ambient air for about 15 seconds, and immersed in a non-solvent bath of deionized water. The coated casting substrate remained immersed in the bath for about 1 to 2 minutes until the membrane began to separate from the casting substrate. The membrane was recovered from the bath, blotted dry with paper towels, placed on paper towels, skin side up, and allowed to dry at room temperature for about 12 hours. Photomicrographs indicated that the membrane possessed the characteristic structure of the membranes of this invention, and that the average pore diameter in the skin or retentive layer of the membrane was about 2 $\mu$m and the average pore diameter on the bottom surface of the support layer was about 60 to 80 $\mu$m.

EXAMPLES 19-20

The following examples illustrate the use of surfactants in the membrane casting solution.

The procedure described in Example 18 was repeated except that only the nylon 6,6 was used to prepare the casting solution instead of the nylon 6 and nylon 6,6 blend and about 16 mg of TRITON-X 100 was added to about 5 g of the casting solution and the mixture was agitated. The resulting mixture was then deposited on a PET casting substrate and spread according the the procedure described in Example 18. Scanning electron photomicrographs of the cross-sections of resulting membrane indicated that the membrane possessed the asymmetric structure characteristic of the membranes of the this invention.

This procedure was repeated using about 16 mg of TWEEN 20. canning electron photomicrographs of the resulting membrane indicated that this membrane also possessed the asymmetric structure of the membranes of this invention.

EXAMPLE 21

This example illustrates the preparation of one of the supported membranes of this invention.

A casting solution was prepared according to the procedure of Example 18 except that the 5 weight percent casting solution was prepared using only the nylon 6,6 described in Example 18. The casting solution was then deposited on one surface of a nylon 6,6 spun-bonded, non-woven web (commercially available from the James River Corporation as CEREX). The coated, non-woven support was then placed on a PET casting substrate coated side up. The coated non-woven support (still resting on the casting substrate) was then exposed to ambient air for about 15 seconds, and immersed in a non-solvent bath of water. The coated support and casting substrate remained immersed in the bath for about 1 to 2 minutes after which time, the coated non-woven support was recovered from the bath, blotted dry with paper towels and was allowed to air dry, skin side up, at ambient temperature for about 12 hours.

Scanning electron photomicrographs of a cross-section of the membrane revealed that the membrane structure was somewhat interrupted by the non-woven fibers, but that the membrane still possessed the asymmetric structure characteristic of the membranes of this invention. Photomicrographs of the top and bottom surfaces of the membrane indicated that the average pore diameter of the skin layer was about 1 μm and the average pore diameter on the bottom surface of the support layer was about 20 to 50 μm.

EXAMPLE 22

This example illustrates that greater water flow rates can be achieved using Applicants' asymmetric membranes than can be achieved using a commercially available, symmetric, nylon membrane.

A membrane was prepared using a 5 weight percent, nylon 6,6 (Celanese 1200-1) casting solution prepared using a 37 weight percent calcium chloride dihydrate and methanol solution. The casting solution was spread on a polyethylene terephthalate casting substrate using a notch bar coater set at a gap of about 0.18 mm. The cast film was exposed to ambient air for about 30 seconds and then immersed in a large non-solvent water bath. The membrane remained immersed in the bath for about 1 to 2 minutes and was then recovered, blotted dry with paper towels, and allowed to dry at room temperature for about 12 hours. The resulting dried membrane was about 0.06 mm thick and scanning electron microscopy revealed that the membrane had skin layer pores of 0.5 μm or less, and pore diameters on the bottom surface of the support layer of 20 to 50 μm.

The water flow rate through this membrane was measured using a 47 mm diameter sample of the membrane die cut from a pinhole-free section of the membrane. The membrane sample was mounted in an apparatus having a 47 mm diameter, stainless steel, Fisher Scientific filter holder such that the skin side of the membrane faced upstream. Water pressure was applied to the upstream side from a pressurized reservoir and the flow of water through the membrane measured with a rotameter located downstream from the membrane. The pressure was held at 345 kPa (50 psig) until water flow through the membrane became constant, at which point, the pressure was decreased in 34.5 kPa (5 psig) increments and the flow rate measured at each pressure.

The water flow rate was also measured on a nylon 6,6 membrane having a 0.22 μm rating (commercially available from MSI Corporation as MAGNA membranes). Scanning electron microscopy revealed that the MSI membrane had surface pores on both surfaces of 2 μm or less. The water flow rate for Applicants' membrane was consistently about an order of magnitude greater than that achieved by the MSI membrane over a pressure range of 34.5 to 207 kPa.

EXAMPLE 23

A membrane was cast from a 12 weight percent, nylon 6,6 (commercially available as Celanese 1200-1) solution using the procedure described in Example 18. except that the cast film was exposed to air for about 30 seconds. The solute rejection coefficient of the resulting membrane was measured using a 0.5 wt. % solution of blue dextran (approximately 2,000,000 MW, available from Sigma Chemical Corporation) having an absorbance of 1.30 at 260 nm, measured using a Hewlett-Packard 8451A Diode Array Spectrophotometer. Ultrafiltration measurements were made on the membrane using a 25 mm Amicon Stirred Ultrafiltration Cell. The permeate volume removed during the experiment was sufficiently small relative to the feed volume that the feed concentration did not appreciably change during the experiment. The permeate was collected and its absorbance was measured using the spectrophotometer described above. The rejection coefficient was then determined using the equation:

$$\text{rejection coefficient} = 1 - C_p/C_f$$

where $C_f$ is the concentration of dextran in the feed solution and $C_p$ is the concentration of dextran in the permeate. At a transmembrane pressure of 276 kPa, the rejection coefficient was 0.95. This indicates that the membrane functioned as an ultrafiltration membrane.

EXAMPLES 24-29

The procedure of Example 18 was repeated except that (a) a 35 weight percent solution of calcium chloride dihydrate dissolved in methanol was used to prepare a 5.0 weight percent, nylon 6,6 (available from Celanese as 1200-1) casting solution, and (b) various air exposure times were used.

The resulting membranes were studied using scanning electron microscopy. Photomicrographs were used to estimate the average pore diameters in the skin layer and on the bottom surface of the support layer. Photomicrographs of cross-sections of the membrane indicated that all of the membranes possessed the asymmetric structure characteristic of the membranes of the invention.

Air flow measurements were also made on the membranes. Air flow rate measurements were made using 25 mm disks cut from a pinhole-free area of the membranes. Membrane samples were mounted in a 25 mm Swinnex filter holder such that the skin layers faced upstream. Nitrogen gas was applied to the upstream side of the membranes at a pressure of 69 kPa (10 psig) and the flow of nitrogen through the membranes was measured using a rotameter located downstream from the filter holder.

The air exposure times, pore diameters, and air flow rates are summarized below in Table 3.

TABLE 3

| Ex. | Exposure time (sec) | Average pore dia. (μm) Skin layer | Bot. surface | Air flow rates [L/(sec)m$^2$] |
|---|---|---|---|---|
| 24 | 0 | 0.5-1 | 50-100 | 307 |
| 25 | 5 | 0.5-1 | 50-100 | 310 |
| 26 | 15 | 0.5-1 | 50-100 | 307 |
| 27 | 30 | <0.5 | 50-100 | 298 |
| 28 | 60 | <0.5 | 50-100 | 297 |
| 29 | 120 | <0.1 | 50 | 150 |

The data shows that the greater the air exposure time the lower the air flow rate will be. This may be because the skin layer is less porous.

EXAMPLES 30-32

The procedure of Example 27 was repeated except that the membranes were cast to various thicknesses. The resulting membranes were studied using scanning electron microscopy. Photomicrographs of cross-sections of the membranes indicated that all of the membranes possessed the characteristic asymmetric structure of the membranes of this invention. Photomicrographs were used to determine the average pore diameter in the skin layer and the average pore diameter on the bottom surface of the membrane's support layer. Air flow rates were measured for each membrane using the procedure described in Examples 24-29.

The knife clearances, pore diameters, and air flow rates are summarized in Table 4.

TABLE 4

| Ex. | Knife Clearance (mm) | Average pore dia. (μm) Skin layer | Average pore dia. (μm) Bot. surface | Air Flow [L/(sec)m²] |
|---|---|---|---|---|
| 30 | 0.13 | <0.5 | 10-20 | 290 |
| 31 | 0.38 | <0.5 | 100-300 | 272 |
| 32 | 0.51 | <0.5 | 200-500 | 210 |

The data shows that the cast thickness affects the pore diameter on the bottom surface of the support layer. The air flow rate may be decreasing because the thickness of the skin layer increased as membrane thickness increased.

EXAMPLES 33-37

The procedure of Example 18 was repeated except that in Examples 33 and 34 a 36 weight percent solution of calcium chloride dihydrate in methanol was used to prepare a 3 weight percent casting solution of nylon 6,6 (Celanese 1200-1), and in Examples 35-37 the calcium chloride/methanol dihydrate solution described above was used to prepare a 4 weight percent casting solution of the nylon 6,6. In addition, various air exposure times were used. The resulting membranes were studied using scanning electron microscopy. The air exposure times, membrane structures, and average pore diameters are summarized below in Table 5.

TABLE 5

| Ex. | Exposure time (sec) | Average pore dia. (μm) Skin layer | Average pore dia. (μm) Bot. surface | Charact. structure |
|---|---|---|---|---|
| 33 | 30 | <0.1 | 100 | yes |
| 34 | 15 | <0.5 | 50-100 | no |
| 35 | 0 | 1.0 | 100 | yes |
| 36 | 15 | 1.0 | 20-50 | yes |
| 37 | 30 | 1.0 | 100 | yes |

The data shows that at the 3 weight percent level of polyamide, and air exposure time can affect whether the membrane will have the characteristic asymmetric structure of the membranes of this invention. However, at the 4 weight percent level of polyamide, the exposure time did not affect whether the membrane had the characteristic asymmetric structure.

EXAMPLES 38-41

The procedure of Example 18 was repeated except that various polyamides were used instead of the NYCOA 589 CELANESE 1200-1 blend. The membranes were studied using scanning electron microscopy. The polyamides used, average pore diameters and membrane structures of the resulting membranes are summarized in Table 6.

TABLE 6

| Ex. | Polyamide | Average pore dia.(μm) Skin layer | Average pore dia.(μm) Bot. surface | Charact. structure |
|---|---|---|---|---|
| 38 | Nylon 6,6 (ZYTEL 101) | 0.2-3 | 20-50 | yes |
| 39 | Nylon 6 (Nycoa 466) | 0.5-5 | 50-100 | yes |
| 40 | Nylon 6 (Nycoa 589) | <0.1 | 50-100 | yes |
| 41 | Nylon 6,9 (Aldrich Chemical) | <0.1 | 30-50 | yes |

EXAMPLES 42-46

The procedure of Example 18 was repeated except that various salts and salt concentrations were used instead of the 37 wt. % solution of calcium chloride dihydrate and CELANESE 1200-1 alone instead of the nylon blend. The resulting membranes were studied using scanning electron microscopy. The salts used, percent concentration of the salt, average pore diameter and membrane structures are summarized in Table 7.

TABLE 7

| Ex. | Salt structure | Conc. Salt (%) | Average pore dia. (μm) Skin layer | Average pore dia. (μm) Bot. surface | Charact. |
|---|---|---|---|---|---|
| 42 | $CaCl_2$ | 29 | <1.0 | 50 | yes |
| 43 | $Ca(NO_3)_2 \cdot 4H_2O$ | 46 | <1.0 | 20-50 | yes |
| 44 | Calcium Salicylate | 53 | 1.0 | 0.5-5 | yes |
| 45 | $CaCl_2 \cdot 4H_2O$ | 56 | <0.5 | 10-20 | yes |
| 46 | LiCl | 24 | 1.0 | 100 | yes |

EXAMPLES 47-49

The procedure of Example 18 was repeated except that various blends of isopropanol and methanol were used instead of methanol to prepare the casting solution and an air exposure time of 5 seconds was used and CELANESE 1200-1 alone was used instead of the nylon blend.

The resulting membranes were studied using scanning electron microscopy. The average pore diameter, membrane structures, and percent volumetric isopropanol/methanol blend used are summarized in Table 8.

TABLE 8

| Ex. | Average pore dia. (μm) Skin layer | Average pore dia. (μm) Bot. surface | Charact. structure | isopropanol/ methanol |
|---|---|---|---|---|
| 47 | <0.1 | 30-50 | yes | 10/90 |
| 48 | <0.1 | 50-100 | yes | 30/70 |
| 49 | <1.0 | 50 | yes | 50/50 |

The data shows that blends of isopropanol and methanol can be used to prepare the casting solution. However, blends containing more than 50 volume percent isopropanol would not dissolve the polyamide.

Various modifications and alterations of this invention will become apparent to those skilled in the art without departing from the scope and spirit of this invention.

We claim:

1. An asymmetric, porous polyamide membrane permeable to fluid flow comprising:
   (A) a porous skin layer, and
   (B) adjacent to the skin layer, an integral, porous support layer having at least one region comprising a network of substantially parallel, hollow tube-like structures, each of the tube-like structures being oriented such that the longitudinal dimension of each tube-like structure is essentially perpendicular to the skin layer;

wherein:
the skin layer is relatively thin and dense compared to the support layer,
the pore diameters in the skin layer are relatively small compared to the diameters of the tube-like structures in the support layer,
in membranes having support layers with more than one region, the cross-sectional area of the tube-like structures is larger in regions located farther from the skin layer, and
the polyamide is an aliphatic polyamide having a glass transition temperature of less than 200° C.

2. The membrane of claim 1 wherein each tube-like structure in a particular region of the support layer has approximately the same cross-sectional area.

3. The membrane of claim 1 having an asymmetric ratio greater than 10.

4. The membrane of claim 1 having an average pore diameter in the skin layer of 0.001 to 10 μm.

5. The membrane of claim 1 wherein the polyamide is selected from the group consisting of
(A) polyamides having the formulas:

(I)

(II)

wherein each R group may be independently selected from the group consisting of H, and alkyl groups having 1 to 4 carbon atoms, and each $R^1$ and $R^2$ or $R^3$ group may be independently selected from the group consisting of linear or branched aliphatic or cycloaliphatic moieties or combinations thereof, wherein said $R^1$, $R^2$, and $R^3$ groups can also contain hetero atoms, or
(B) blends thereof.

6. The membrane of claim 5 wherein all $R^1$ groups in any particular polymer (I) are the same, and all $R^2$ groups in any particular polymer (I) are the same, and all $R^3$ groups in any particular polymer (II) are the same.

7. The membrane of claim 5 wherein $R^1$, $R^2$ and $R^3$ groups contain from 1 to 12 carbon atoms.

8. The membrane of claim 1 wherein the polyamide is selected from the group consisting of nylon 6, nylon 6,6, nylon 6,9, copolymers thereof, and blends thereof.

9. The membrane of claim 1 having an air flux rate of 2.5 to 75 L/kPa(sec)m².

10. The membrane of claim 1 in the form of a sheet.

11. The membrane of claim 1 in the form of a hollow fiber.

12. A supported asymmetric membrane comprising the membrane of claim 1 and a preformed, porous, support layer having two parallel surfaces.

13. The membrane of claim 12 wherein the support layer is selected from the group consisting of non-woven web, woven cloth and paper.

14. The membrane of claim 12 wherein the non-woven web is a spun-bonded, nylon 6,6 non-woven web.

15. The membrane of claim 1 prepared by a process comprising the steps of:
(A) preparing a casting solution comprising an aliphatic polyamide, having a glass transition temperature less than 200° C., dissolved in an alcohol/salt solution;
(B) coating a film of preselected thickness of the casting solution onto the surface of a casting substrate;
(C) exposing the resulting film to a non-solvent liquid bath thereby precipitating the polyamide and forming the porous, asymmetric polyamide membrane; and
(D) recovering the membrane from the bath and drying it.

16. The membrane of claim 15 wherein the process of preparing the membrane further comprises a step after step (B) and before step (C) in which the film of casting solution is exposed to air for a period of up to 120 seconds.

17. The membrane of claim 15 wherein said alcohol is a lower alkanol or a blend of lower alkanols.

18. The membrane of claim 17 wherein said alcohol is selected from the group consisting of methanol, ethanol, propanol, butanol, and mixtures of ethanol and methanol, ethanol and propanol, and methanol and propanol.

19. The membrane of claim 15 wherein the salt is selected from the group consisting of anhydrous calcium chloride, calcium chloride dihydrate, calcium iodide tetrahydrate, calcium nitrate tetrahydrate, calcium salicylate, lithium chloride and blends thereof.

20. The membrane of claim 15 wherein the casting solution comprises 10 to 50 weight percent salt, 47 to 76 weight percent alcohol, and 3 to 14 weight percent polyamide.

21. The membrane of claim 12 prepared by a process comprising the steps of:
(A) preparing a casting solution comprising an aliphatic polyamide, having a glass transition temperature less than 200° C., dissolved in an alcohol/salt solution;
(B) coating a film of preselected thickness of the casting solution onto one or both parallel surfaces the porous, preformed support;
(C) placing the coated, preformed support on a casting substrate;
(D) immersing the coated, preformed support and casting substrate in a non-solvent liquid bath thereby precipitating the polyamide and forming the supported, porous, asymmetric polyamide membrane; and
(E) recovering the supported membrane from the bath and drying it.

22. The membrane of claim 21 wherein the process of preparing the membrane further comprises a step after step (C) and before step (D) in which the coated, preformed support is exposed to air for a period of up to 120 seconds.

23. The membrane of claim 21 wherein the porous preformed support is selected form the group consisting of non-woven webs, woven fabrics, and paper.

24. The membrane of claim 11 prepared by a process comprising the steps of:

(A) preparing a casting solution comprising an aliphatic polyamide, having a glass transition temperature less than 200° C., dissolved in an alcohol/salt solution;

(B) extruding a hollow fiber of the casting solution through an annular die;

(C) immersing the resulting fiber in a non-solvent liquid bath thereby precipitating the polyamide and forming the porous, asymmetric, polyamide, hollow fiber membrane; and (D) recovering the membrane from the bath and drying it.

25. The membrane of claim 24 wherein the process of preparing the membrane further comprises a step after step (B) and before step (C) in which the fiber of casting solution is exposed to air for a period of up to 120 seconds.

26. A process for making a porous asymmetric membrane comprising the steps of:

(A) preparing a casting solution comprising an aliphatic polyamide, having a glass transition temperature less than 200° C., dissolved in an alcohol/salt solution;

(B) coating a film of preselected thickness of the casting solution onto the surface of a casting substrate;

(C) exposing the resulting film to a non-solvent liquid bath thereby precipitating the polyamide and forming the porous, asymmetric polyamide membrane; and (D) recovering the membrane from the bath and drying it.

27. The process of claim 26 further comprising a step after step (B) and before step (C) in which the film of casting solution is exposed to air for a period of up to 120 seconds.

28. A process for preparing a supported, porous asymmetric membrane comprising the steps of:

(A) preparing a casting solution comprising an aliphatic polyamide, having a glass transition temperature less than 200° C., dissolved in an alcohol/salt solution;

(B) coating a film of preselected thickness of the casting solution onto one or both parallel surfaces of a porous, preformed support;

(C) placing the coated, preformed support on a casting substrate;

(D) immersing the coated, preformed support and casting substrate in a non-solvent liquid bath thereby precipitating the polyamide and forming the supported, porous, asymmetric polyamide membrane; and (E) recovering the supported membrane from the bath and drying it.

29. The process of claim 28 further comprising a step after step (C) and before step (D) in which the coated, preformed support is exposed to air for a period of up to 120 seconds.

30. A process of preparing a porous, asymmetric hollow fiber member comprising the steps of:

(A) preparing a casting solution comprising an aliphatic polyamide, having a glass transition temperature less than 200° C., dissolved in an alcohol/salt solution;

(B) extruding a hollow fiber of the casting solution through an annular die;

(C) immersing the resulting fiber in a non-solvent liquid bath thereby precipitating the polyamide and forming the porous, asymmetric, polyamide, hollow fiber membrane; and (D) recovering the membrane from the bath and drying it.

31. The process of claim 30 further comprising a step after step (B) and before step (C) in which the fiber of casting solution is exposed to air for a period of up to 20 seconds.

* * * * *

UNITED STATES PATENT AND TRADEMARK OFFICE
CERTIFICATE OF CORRECTION

PATENT NO. : 5,006,247

DATED : April 9, 1991

INVENTOR(S) : KATHLEEN A. DENNISON, ET AL.

It is certified that error appears in the above-identified patent and that said Letters Patent is hereby corrected as shown below:

Col. 8, line 6, insert a period after "layer".

Col. 9, line 63, Delete "be".

Col. 12, line 33, after "according" delete "the" 1st occurence and insert --to--.

Col. 12, line 38, Delete "the".

Col. 12, line 40, "canning" should be --Scanning--.

Col. 18, line 65, "form" should be --from--.

In the Abstract, line 17, "membrances" should be --membranes--.

Signed and Sealed this

First Day of December, 1992

*Attest:*

DOUGLAS B. COMER

*Attesting Officer*  *Acting Commissioner of Patents and Trademarks*